US011244346B2

(12) United States Patent
Qin et al.

(10) Patent No.: US 11,244,346 B2
(45) Date of Patent: Feb. 8, 2022

(54) SYSTEMS AND METHODS OF ADVERTISEMENT CREATIVES OPTIMIZATION

(71) Applicant: WAL-MART STORES, INC., Bentonville, AR (US)

(72) Inventors: Zhiwei Qin, San Jose, CA (US); Somnath Banerjee, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 973 days.

(21) Appl. No.: 15/239,531

(22) Filed: Aug. 17, 2016

(65) Prior Publication Data

US 2018/0053205 A1 Feb. 22, 2018

(51) Int. Cl.
*G06Q 30/02* (2012.01)
(52) U.S. Cl.
CPC ..... *G06Q 30/0243* (2013.01); *G06Q 30/0277* (2013.01)
(58) Field of Classification Search
CPC ................ G06Q 30/0243; G06Q 30/0277
See application file for complete search history.

(56) References Cited

U.S. PATENT DOCUMENTS

| | | | | |
|---|---|---|---|---|
| 5,848,396 | A * | 12/1998 | Gerace | G06Q 30/02 705/7.33 |
| 2007/0027865 | A1* | 2/2007 | Bartz | G06Q 30/0241 |
| 2009/0030784 | A1 | 1/2009 | Goyal et al. | |
| 2010/0138452 | A1* | 6/2010 | Henkin | G06Q 30/02 707/803 |
| 2011/0258054 | A1* | 10/2011 | Pandey | G06F 40/247 705/14.72 |
| 2011/0258056 | A1* | 10/2011 | Ioffe | G06Q 30/02 705/14.73 |

(Continued)

OTHER PUBLICATIONS

Lobo, Second Order Cone Programming, Oct. 20, 1997, Stanford University.*

(Continued)

*Primary Examiner* — Arthur Duran
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving a plurality of advertisement creatives for an advertisement campaign, generating first predefined frequency weights for the plurality of advertisement creatives, and coordinating a display of the plurality of advertisement creatives within the impression slot of the webpages displayed to the online users based on the first predefined frequency weights. The first predefined frequency weights include a weighted frequency that each advertisement creative of the plurality of advertisement creatives should be displayed to the online users. A first advertisement creative of the can be displayed more frequently than a second advertisement creative because the first advertisement comprises a first frequency weight that is higher than a second frequency weight of the second advertisement creative.

20 Claims, 5 Drawing Sheets

(56) References Cited

U.S. PATENT DOCUMENTS

| | | | |
|---|---|---|---|
| 2012/0022952 A1* | 1/2012 | Cetin | G06Q 10/04 |
| | | | 705/14.73 |
| 2012/0150626 A1* | 6/2012 | Zhang | G06Q 30/0241 |
| | | | 705/14.42 |
| 2014/0039823 A1* | 2/2014 | Raghupathy | G01S 5/021 |
| | | | 702/94 |
| 2014/0114746 A1 | 4/2014 | Pani et al. | |
| 2014/0188774 A1* | 7/2014 | George | G05B 23/0254 |
| | | | 706/46 |
| 2015/0302467 A1* | 10/2015 | Ko | G06Q 30/0247 |
| | | | 705/14.46 |
| 2015/0324857 A1* | 11/2015 | Siegel | G06Q 30/0267 |
| | | | 705/14.64 |
| 2016/0191450 A1* | 6/2016 | Lineberger | G06Q 50/01 |
| | | | 709/206 |
| 2018/0053205 A1* | 2/2018 | Qin | G06Q 30/0277 |

OTHER PUBLICATIONS

Shivaswamy, Second Order Cone Programming Approaches for Handling Missing and Uncertain Dta, Jul. 2006, Journal of Machine Learning Research, p. 1283-1314.*

D. Goldfarb and G. Iyengar; "CORC Technical Report TR-2002-03 Robust portfolio selection problems" pp. 1-41; Dec. 26, 2001.

* cited by examiner

400

| 405 – Receiving a plurality of advertisement creatives for an advertisement campaign. |

↓

| 407 – Determining at least one of a conversion rate or a click-through rate for each advertisement creative of the plurality of advertisement creatives. |

↓

| 410 – Generating first predefined frequency weights for the plurality of advertisement creatives. |

↓

| 420 – Reducing statistical noise of a covariance matrix and a mean of a conversion rate for each advertisement creative of the plurality of advertisement creatives |

↓

| 425 – Combining both the long-term conversion rate and the short-term conversion rate for each advertisement creative of the plurality of advertisement creatives. |

↓

| 430 – Automatically setting one or more tuning parameters for the optimal frequency weights. |

↓

| 435 – Requiring a best-case expected return for each advertisement creative to exceed a predetermined level. |

↓

| 440 – Maximizing a worst-case expected return for each advertisement creative. |

↓

| 445 – Setting a penalty parameter. |

↓

| 412 – Selecting which advertisement creative of the plurality of advertisement creatives are to be displayed for the maximized total conversion of the advertisement. |

↓

| 415 – Coordinating a display of the plurality of advertisement creatives based on the first predefined frequency weights. |

FIG. 4

SYSTEMS AND METHODS OF ADVERTISEMENT CREATIVES OPTIMIZATION

TECHNICAL FIELD

This disclosure relates generally to optimization of impressions of advertisement creatives.

BACKGROUND

A given advertisement campaign can include multiple advertisement creatives for display on a webpage. Advertisement creatives can include various visual renderings of a particular advertisement campaign. Conventional systems select each advertisement creative at equal or random frequencies for display on the webpage.

BRIEF DESCRIPTION OF THE DRAWINGS

To facilitate further description of the embodiments, the following drawings are provided in which:

FIG. 4 is a flowchart for a method, according to an embodiment; and

Figure 1:
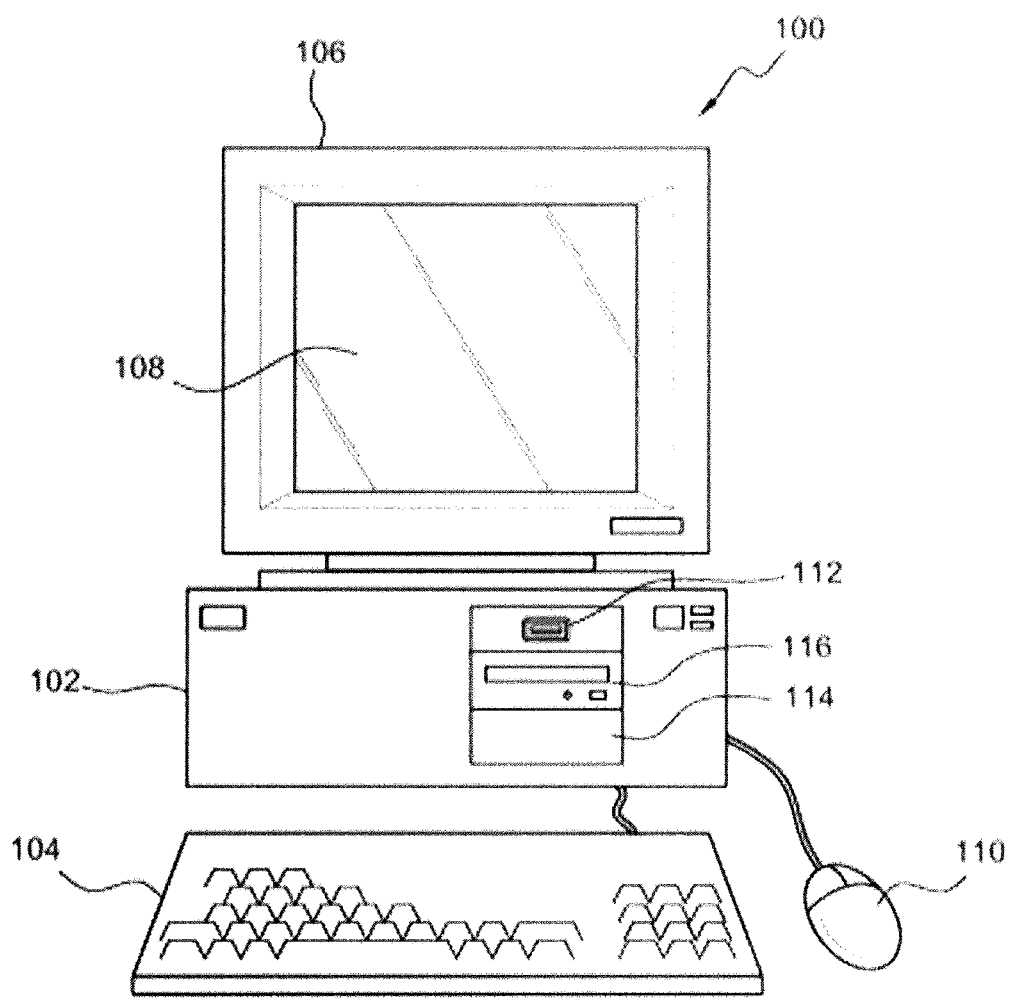
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more processing modules can be configured to run on the one or more processing modules and perform the act of receiving a plurality of advertisement creatives for an advertisement campaign. Each advertisement creative of the plurality of advertisement creatives can be for display within an impression slot of webpages displayed to online users, wherein the plurality of advertisement creatives have a first set of dimensions and the impression slot has the first set of dimensions. The one or more processing modules can be configured to run on the one or more processing modules and perform the act of generating first predefined frequency weights for the plurality of advertisement creatives. The first predefined frequency weights can comprise a weighted frequency that each advertisement creative of the plurality of advertisement creatives are to be displayed to the online users. The one or more processing modules can be configured to run on the one or more processing modules and perform the act of coordinating a display of the plurality of advertisement creatives within the impression slot of the webpages displayed to the online users based on the first predefined frequency weights, as generated, such that a first advertisement creative of the plurality of advertisement creatives is displayed more frequently than a second advertisement creative of the plurality of creatives because the first advertisement comprises a first frequency weight that is higher than a second frequency weight of the second advertisement creative.

Various embodiments include a method. The method can include receiving a plurality of advertisement creatives for an advertisement campaign. Each advertisement creative of the plurality of advertisement creatives can be for display within an impression slot of webpages displayed to online users, wherein the plurality of advertisement creatives have a first set of dimensions and the impression slot has the first set of dimensions. The method can also include generating first predefined frequency weights for the plurality of advertisement creatives. The first predefined frequency weights can comprise a weighted frequency that each advertisement creative of the plurality of advertisement creatives are to be displayed to the online users. The method can also include coordinating a display of the plurality of advertisement creatives within the impression slot of the webpages displayed to the online users based on the first predefined frequency weights, as generated, such that a first advertisement creative of the plurality of advertisement creatives is displayed more frequently than a second advertisement creative of the plurality of creatives because the first advertisement comprises a first frequency weight that is higher than a second frequency weight of the second advertisement creative.

Various embodiments disclosed herein describe methodology and optimization models for advertisement creatives optimization. In some embodiments, an advertiser sets up a display advertisement campaign by supplying advertisement creatives, defining a target user segment, and defining a webpage context. Delivery or coordinating display of an advertisement impression can be driven by a targeted user visiting a webpage within the given webpage context. In some embodiments, the advertiser provides multiple advertisement creatives of the same size, of which advertisement creatives the impressions are delivered by an advertisement server to the viewers on a rotational basis following a predefined set of optimal frequency weights. In some embodiments, every time an advertisement impression is to be delivered and there are multiple advertisement creatives available for the given size of advertisement impression, a probability that a particular advertisement creative is chosen is equal or proportional to its corresponding frequency weight. Thus, conversions of the advertisement creatives can by maximized by exploiting the differences in the intrinsic attractiveness for conversion. The advertisement creatives can be variations of the same advertisement, with different color schemes or text messages. In some embodiments, a predefined set of optimal frequency weights is generated such that the total conversion for the advertisement campaign is maximized.

Various embodiments disclosed herein are necessarily rooted in computer technology in order to overcome one or more problems specifically arising in the realm of computer networks, the internet, an intranet, etc. For example, a problem encountered with ecommerce websites on computer networks is displaying advertisement creatives that maximize conversion of advertisement based on at least one of a click-through rate or a conversion rate of the advertisement creative. More specifically, ecommerce websites on computer networks must determine which of a plurality of advertisement creatives should be displayed to maximize conversion of the advertisement campaign. Thus, if a first advertisement creative and a second advertisement creative have been displayed an equal number of times on webpages of an ecommerce website, systems contemplated herein can coordinate display of the first advertisement creative on a subsequent webpage of the ecommerce website rather than the second advertisement creative if the first advertisement creative has a higher predefined optimal frequency weight than the second advertisement creative. Furthermore, in some embodiments, generating first predefined frequency weights for a plurality of advertisement creatives and coordinating display of the plurality of advertisement creatives based on the first predefined frequency weight, as generated, can be performed automatically and in real-time by various systems described herein. Thus, websites utilizing the various systems and methods described herein are able to display advertisement creatives both at a frequency that will maximize conversion of the advertisement, and also at a speed that a user of the website will not perceive a lag time while the system determines which advertisement creative to display to maximize conversion of the advertisement.

Figure 2:
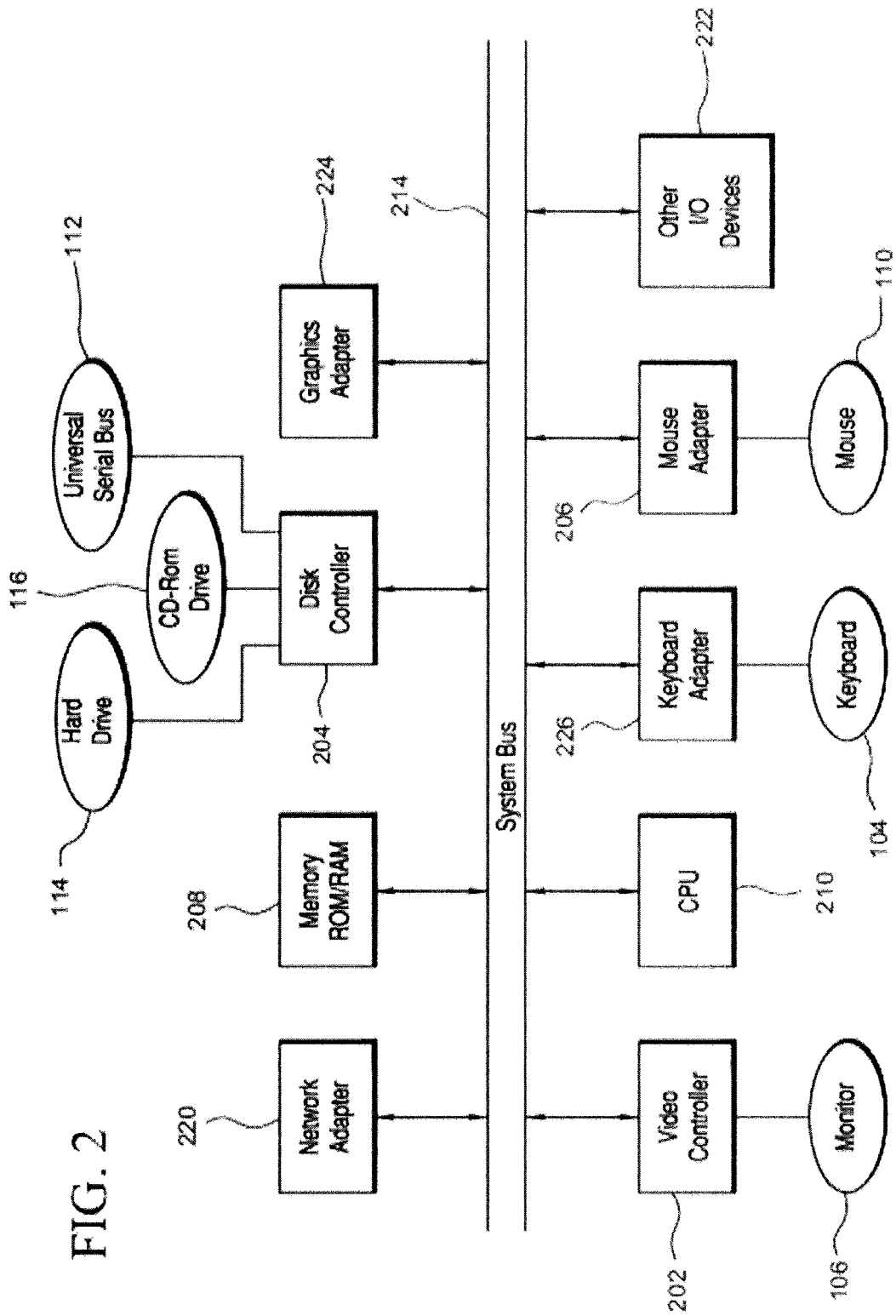
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
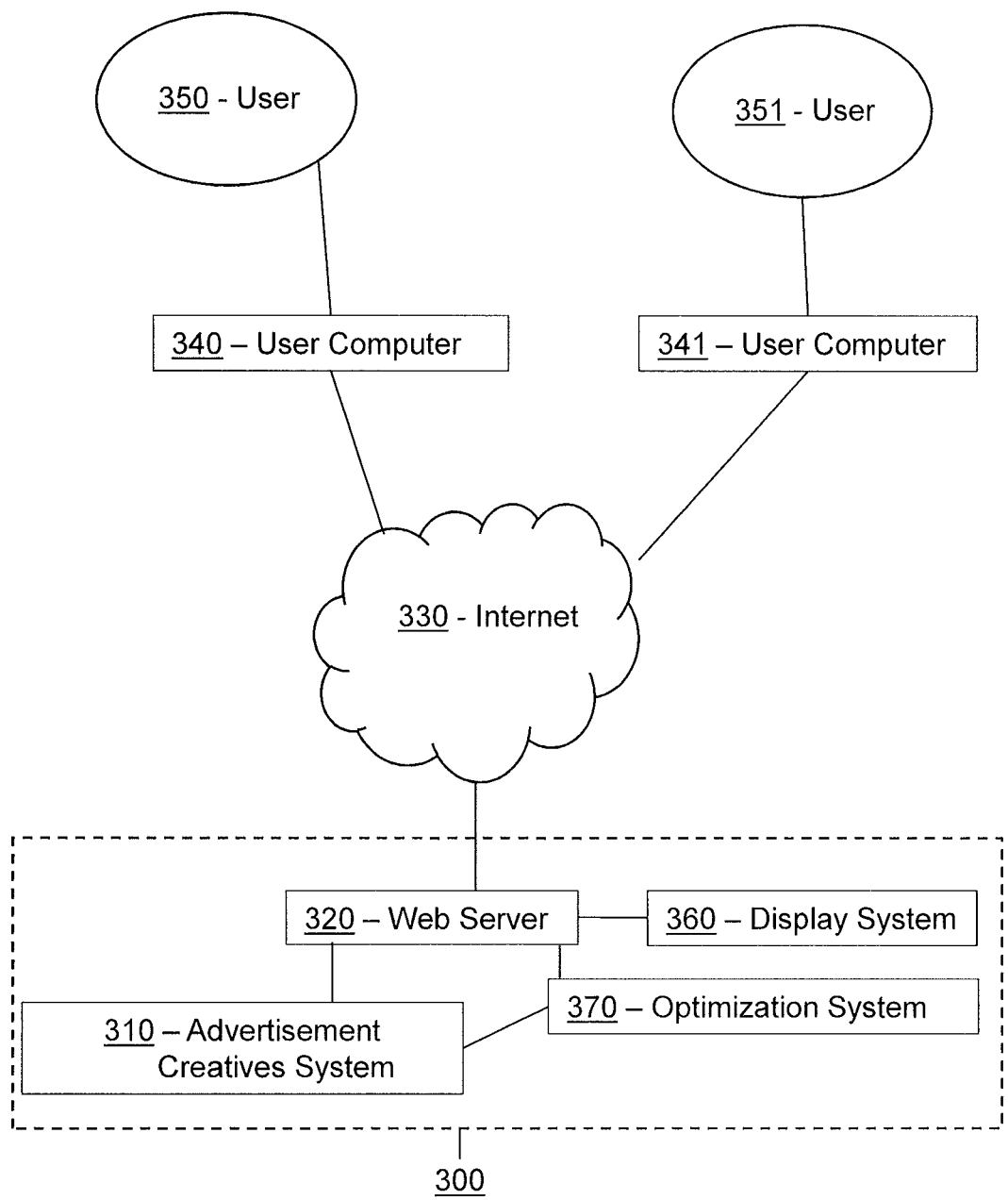
FIG. 3 illustrates a representative block diagram of a system, according to an embodiment.

Turning ahead in the drawings, FIG. 3 illustrates a block diagram of a system 300 that can be employed for display of optimization of advertisement creatives. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an advertisement creatives system 310, a web server 320, a display system 360, and/or an optimization system 370. Advertisement creatives system 310, web server 320, display system 360, and optimization system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of advertisement creatives system 310, web server 320, display system 360, and optimization system 370. Additional details regarding advertisement creatives system 310, web server 320, display system 360, and optimization system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, advertisement creatives system 310, web server 320, display system 360, and optimization system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) topic modeling system 310, web server 320, display system 360, and user attribute system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module (s) and/or the memory storage module(s). In some embodiments, the KVM switch also can be part of advertisement creatives system 310, web server 320, display system 360, and optimization system 370. In a similar manner, the processing module(s) and the memory storage module(s) can be local and/or remote to each other.

In many embodiments, advertisement creatives system 310, web server 320, display system 360, and optimization system 370 can be configured to communicate with one or more customer computers 340 and 341. In some embodiments, customer computers 340 and 341 also can be referred to as user computers. In some embodiments, advertisement creatives system 310, web server 320, display system 360, and optimization system 370 can communicate or interface (e.g. interact) with one or more customer computers (such as customer computers 340 and 341) through a network or internet 330. Internet 330 can be an intranet that is not open to the public. Accordingly, in many embodiments, advertisement creatives system 310, web server 320, display system 360, and optimization system 370 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, advertisement creatives system 310, web server 320, display system 360, and optimization system 370 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between advertisement creatives system 310, web server 320, display system 360, and optimization system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 5:
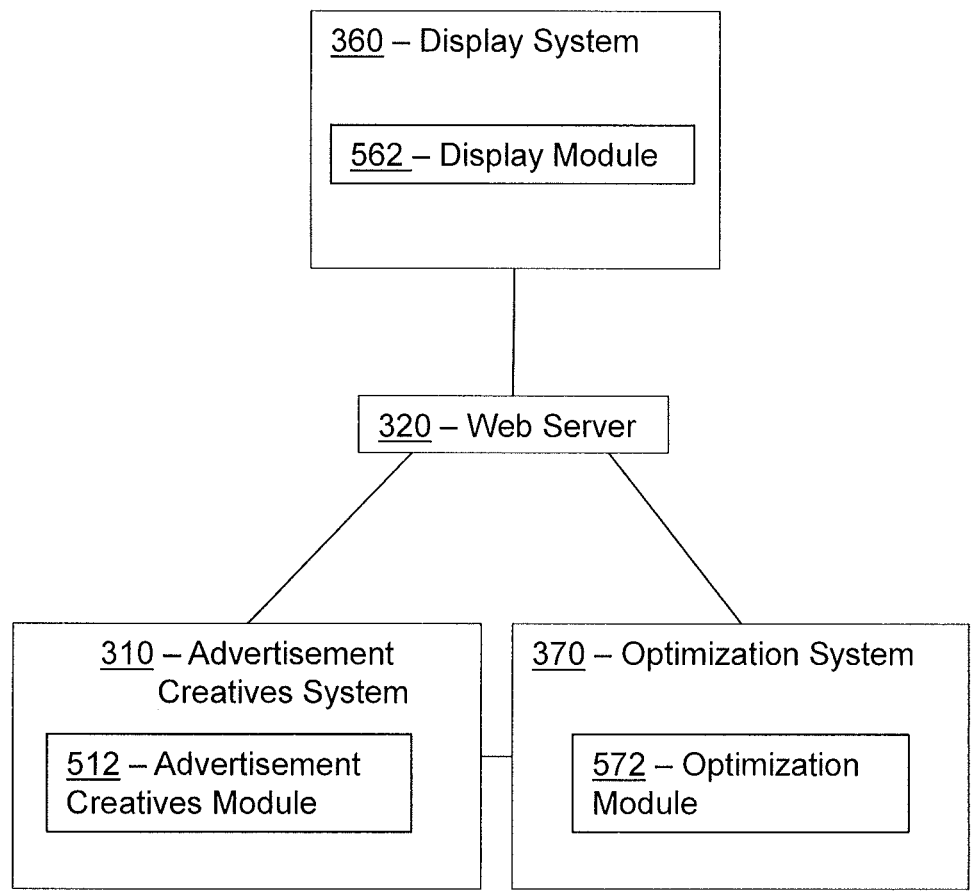
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, and/or 572 (FIG. 5). Such non-transitory memory storage modules can be part of a computer system such as advertisement creatives system 310 (FIGS. 3 & 5), display system 360 (FIGS. 3 & 5), and/or optimization system 370 (FIGS. 3 & 5). The processing module(s) can be similar or identical to the processing module(s) described above with respect to computer system 100 (FIG. 1).

Method 400 can comprise an activity 405 of receiving a plurality of advertisement creatives for an advertisement campaign. More particularly, method 400 can comprise an activity of receiving a plurality of advertisement creatives for an advertisement campaign, each advertisement creative of the plurality of advertisement creatives for display within an impression slot of webpages displayed to online users, wherein the plurality of advertisement creatives have a first set of dimensions and the impression slot has the first set of dimensions. In some embodiments, the plurality of advertisement creatives can be equal-sized to the impression slot of the webpages. The impression slot(s) can be on a plurality of webpages and can be equal-sized on each webpage of the plurality of webpages. Thus, within a non-limiting advertisement campaign, multiple advertisement creatives of the same dimension can be rotated to display within the same impression slot of a webpage. The plurality of advertisement creatives also can be variations of the same advertisement and/or advertisement campaign, with different color schemes and/or text messages for each advertisement creative of the plurality of advertisement creatives. In some embodiments, the advertiser also can define one or more target user segments and one or more webpage contexts for the advertisement campaign and/or the advertisement creatives. More particularly, the products or items of the advertisement campaign, the targeting segment of the advertisement campaign, and the context of the advertisement campaign can all be fixed by the advertiser.

In many embodiments, the plurality of advertisement creatives can be received from or supplied by an advertiser. In more particular embodiments, a user can request a webpage from a content server, and the content server can return webpage content with advertisement html to the user's computer. The user's computer can then send an advertisement request to an advertisement server, and the advertisement server can allocate an impression of an advertisement creative to the user's computer for display, as described in greater detail elsewhere in this document. Thus, in many embodiments, while an advertisement server can deliver one or more advertisement creatives, an administrator can control parameters for how often certain advertisement creatives are delivered to the computer of a user for display.

Next, method 400 can comprise an activity 407 of determining at least one of a conversion rate or a click-through rate for each advertisement creative of the plurality of advertisement creatives. A conversion rate for a particular advertisement creative of the plurality of advertisement creatives can comprise a number of times a product is purchased after a user clicks on or otherwise selects the particular advertisement creative per a number of times the particular advertisement creative is delivered for display in an impression slot of a webpage. A click-through rate for a particular advertisement creative of the plurality of advertisement creatives can comprise a number of times an advertisement is clicked on or otherwise selected by a user per a number of times the particular advertisement creative is delivered for display in an impression slot of a webpage.

In some embodiments, determining at least one of a conversion rate or a click-through rate for each advertisement creative of the plurality of advertisement creatives can comprise determining a conversion rate for each advertisement creative of the plurality of advertisement creatives, the conversion rate for each advertisement creative of the plurality of advertisement creatives comprising at least one of (1) a long-term conversion rate for each advertisement creative of the plurality of advertisement creatives as measured since the advertisement campaign began, or (2) a short-term conversion rate for each advertisement creative of the plurality of advertisement creatives as measured in a shorter predetermined period of time. In some embodiments, determining at least one of a conversion rate or a click-through rate for each advertisement creative of the plurality of advertisement creatives can comprise determining a click-through rate for each advertisement creative of the plurality of advertisement creatives, the click-through rate for each advertisement creative of the plurality of advertisement creatives comprising at least one of (1) a long-term click-through rate for each advertisement creative of the plurality of advertisement creatives as measured since the advertisement campaign began, or (2) a short-term click-through rate for each advertisement creative of the plurality of advertisement creatives as measured in a shorter predetermined period of time. Still other embodiments can comprise determining any combination of a long-term click-through rate, a short-term click-through rate, a long-term conversion rate, and/or a short-term conversion rate.

After activity 407, method 400 can comprise an activity 410 of generating first predefined frequency weights for the plurality of advertisement creatives. According to some aspects, the first predefined frequency can be optimal frequency weights for the plurality of advertisement creatives for a maximized total conversion of the advertisement campaign. More particularly, method 400 can comprise an activity of generating first predefined frequency weights for the plurality of advertisement creatives, the first predefined frequency weights comprising a weighted frequency that each advertisement creative of the plurality of advertisement creatives are to be displayed to the online users for a maximized total conversion of the advertisement campaign.

In some embodiments, an activity 410 of generating first predefined frequency weights for the plurality of advertisement creatives can comprise using one or more formulations. In some embodiments, a plurality of advertisement creatives (m) are available for rotation at a given impression slot. The conversion rates of the advertisement creatives can be denoted by an m-vector r, which has mean μ and covariance matrix D for conversion rates of each advertisement creatives, with sigma squares on the diagonal of the covariance matrix. More particularly, μ is a mean of conversion rates for each advertisement creative, $\underline{\mu}$ is a lower bound of μ, and $\overline{\mu}$ is an upper bound of μ. Assuming that the advertisement creatives are independent from each other, D=diag($\sigma^2$), where a is the m-vector of a standard deviation of a conversion rate for each advertisement creative of the plurality of advertisement creatives. The mean conversion rates can vary within the box constraints:

$$\mu \in \{\underline{\mu} \geq \mu \geq \overline{\mu}\},$$

and similarly for the co-variance matrix:

$$D \in \{\text{diag}(\sigma^2), \sigma_i \in [\underline{\sigma}_i, \overline{\sigma}_i]\}.$$

The decision variables can be an m-vector w, the impressions allocation/distributions weights in percentages, or a vector frequency weight, for delivering each advertisement creative of the plurality of advertisement creatives for display in an impression slot. Hence, $$w \in W, \text{ the simplex } W := \{w | w \geq 0, e^T w = 1\},$$

where e is a standard representation of a vector of all ones, W constrains the w's elements to be between 0 and 1 and sum up to 1, and T is a transpose.

In some embodiments, activity 410 of generating first predefined frequency weights for the plurality of advertisement creatives of method 400 can comprise an activity 435 of requiring a best-case expected return for each advertisement creative of the plurality of advertisement creatives to exceed a predetermined level. More particularly, in some embodiments, a mean-variance optimization, or the Markowitz model, can be used as part of generating first predefined frequency weights for the plurality of advertisement creatives. Mean-variance optimization can maximize the expected return, while also controlling the total variance (i.e. risk) at a given level. The variance here can be inherent to the assumption on the statistical distribution of the expected returns, for example, binomial distribution. Requiring the best-case expected return for each advertisement creative of the plurality of advertisement creatives to exceed a predetermined level can be accomplished with Formulation 1:

$$\max_w \mu^T w$$

$$\text{subject to: } w^T D w \leq p$$

$$e^T w = 1$$

$$w \geq 0,$$

where p is a given constraint on a portfolio variance.

In some embodiments, a solution of Formulation 1 can be sensitive to the noise in the input parameters μ and D. These input parameters can sometimes be estimated from noise data. Furthermore, setting p is sometimes not clear. One or more embodiments of this disclosure consider one or more of the following improvements: (1) robustify the basic mean-variance model; (2) tuning parameters that set automatically or are easy to set; and (3) sufficiently exploring the multi-arm bandits (MAB) setting. As shall be described in greater detail below, in some embodiments, activity 410 of generating first predefined frequency weights for the plurality of advertisement creatives of method 400 can comprise an activity 420 of reducing statistical noise of a covariance matrix and a mean of a conversion rate for each advertisement creative of the plurality of advertisement creatives. The conversion rate for each advertisement creative of the plurality of advertisement creatives can comprise at least one of (1) a long-term conversion rate for each advertisement creative of the plurality of advertisement creatives as measured since the advertisement campaign began, or (2) a short-term conversion rate for each advertisement creative of the plurality of advertisement creatives as measured in a predetermined period of time.

According to some aspects, a model for generating first predefined frequency weights can take into account the uncertainty the input parameters p and D, which exhibits itself as box constraints $\{\underline{\mu} \geq \mu \geq \overline{\mu}\}$ and $\{\underline{D} \geq D \geq \overline{D}\}$, where $\underline{D}$ is a lower bound of D, and $\overline{D}$ is an upper bound of D. More specifically, conversion rates for each advertisement creative of the plurality of advertisement creatives in a predetermined period of time, such as but not limited to seven days, can be considered while setting $\underline{\mu}$ and $\overline{\mu}$ to be the minimum and maximum of the uncertainty set. $\overline{D}$ can be similarly set. The formulation can be as follows in Formulation 2:

$$\min_w -\underline{\mu}^T w + \rho w^T \overline{D} w$$

$$\text{subject to: } (\mu+\sigma)^T w \geq q$$

$$e^T w = 1$$

$$w \geq 0,$$

where q is a benchmark conversion rate level. Formulation 2 can comprise a diagonal covariance matrix assumption.

In some embodiments, therefore, activity 410 of generating first predefined frequency weights for the plurality of advertisement creatives of method 400 can comprise an activity 440 of maximizing a worst-case expected return for each advertisement creative of the plurality of advertisement creatives. More particularly, a worst-case expected return can be maximized, while also requiring that the best-case expected return exceed a certain level in some embodiments. Formulation 2 is a quadratic program (QP) and can be solved by a QP solver, typically using interior-point method. Formulation 2 also can be equivalently formulated as a second-order cone program (SOCP) by introducing an additional decision variable δ of Formulation 3:

$$\min_{W\delta} -\underline{\mu}^T w + \rho \delta$$

$$\text{subject to: } \left\| \overline{D}^{\frac{1}{2}} w \right\| \leq \delta$$

$$(\mu + \sigma)^T w \geq q$$

$$e^T w = 1$$

$$w \geq 0,$$

Where ρ is a penalty parameter, and δ is a decision variable which in the optimal solution is equal to the portfolio standard deviation. The penalty parameter in Formulation 3 is different from other Formulation 2. Setting the penalty parameter in this formulation can be intuitive. For example, in an optimal solution, $$\rho = \left\| \overline{D}^{\frac{1}{2}} w \right\|,$$

which is an estimate of a standard deviation of $\mu^T w$. Hence, an original objective function $\mu^T w - \rho \delta$ can be interpreted as the lowest point in the ellipsoid (approximating the distribution of $\mu^T w$ by Gaussian) that is desirable to be maximized. In some embodiments, $\rho$ can determine the number of standard deviations and can, for example be set to $\rho=1$. Therefore, in some embodiments, activity 410 of generating first predefined frequency weights for the plurality of advertisement creatives of method 400 can comprise an activity 445 of setting a penalty parameter.

In some embodiments, activity 410 of method 400 can comprise an activity 430 of automatically setting one or more tuning parameters for the first predefined frequency weights. The tuning parameters can comprise one or more of $\rho$ and q. Setting $\rho$ as a tuning parameter can comprise one or more of the activities described above. Setting q as a tuning parameter can comprise setting q to a value of the left-hand-side of the formulation, with w equal to the weight distribution proportional to the current total impressions allocation. More particularly, w is a decision variable, and q can be a constant and can be computer by setting w on the left-hand-side to the proposed values.

According to some aspects, generating first predefined frequency weights depends on the input estimates for the conversion rates of the advertisement creatives, which are open to multiple interpretations. In some embodiments, a cumulative conversion or long-term conversion rate is used, which is measured from the launch of the advertisement campaign. For an advertisement campaign that has been running for a relatively long period of time, the conversion trend observed more recently (i.e., the short-term conversion rate) may not align well with the long-term conversion rate. Depending on which of the short-term or long-term conversion rates is used, the generating first predefined frequency weights could be considerably different. In some embodiments, a balance is achieved between the long-term rates and the short-term rates.

In some embodiments, activity 410 of generating first predefined frequency weights for the plurality of advertisement creatives of method 400 can comprise an activity 425 of combining both the long-term conversion rate and the short-term conversion rate for each advertisement creative of the plurality of advertisement creatives. Using long-term and short-term conversion rates of the advertisement creatives produces two different sets of results. The two sets of results can be combined together by entering each result vector into both sets of input parameters to obtain two random variables representing two different portfolios, each defined by its mean and variance. It is noted that the parameters for long-term conversion rates of each advertisement creative of the plurality of advertisement creatives is $\theta_L := (\mu_L, \Sigma_L)$, and the parameter for short-term conversion rates of each advertisement creative of the plurality of advertisement creatives is $\theta_S := (\mu_S, \Sigma_S)$. The weights are obtained by solving Formulation 3 with $\theta_L$ and $\theta_S$ as input parameters $w(\theta_L)$ and $w(\theta_S)$, respectively, and $w_L$ and $w_S$ in short form. With these parameters and the corresponding solutions in place, four different random variables representing the total conversion rate of the resulting advertisement creatives portfolio can be obtained by assembling impressions of advertisement creatives with conversion rate parameters $\theta$ using weights w. For example, $R_{LS}$ can denote a resulting random variable with mean $\mu_L^T w_S$ and variance $w_S^T \Sigma_L w_S$. $P(R_{LL} > R_{LS})$ and $P(R_{SL} > R_{SS})$ are computed, and a final convex combination coefficient for combining wL and wS is set to $\frac{1}{2}(P(R_{LL} > R_{LS}) + P(R_{SL} > R_{SS}))$. These probabilities are computed with the Gaussian assumption. The convex combination coefficient may also be referred to as a convex combination parameter, and is an average of the short-term conversion rate and the long-term conversion rate.

Availability of conversion rate data for the plurality of advertisement creatives typically lags behind the current time due to the attribution window for collecting and matching purchase information. This window could be as long as two weeks. While using the most recent empirical conversion rates of the advertisement creatives as input in generating optimal frequency weights is viable, strong trends can affect performance of the optimization model. To address this problem, a machine learning model for predicting the advertisement creatives conversion rates for the immediate future is described herein. The features for the predictive model can comprise one or more of the following groups: (1) current click-through rates and last week click-through rates for each advertisement creative of the plurality of advertisement creatives; (2) the latest (ergo, two-week old, or three-week old) conversion rate for each advertisement creative of the plurality of advertisement creatives; and (3) averages of (1) and (2) for each advertisement creative relative to other advertisement creatives of the plurality of advertisement creatives. These groups cover information on a given advertisement creative's current performance, recent trend, and its immediate peers' performances. The training spans over all the line items within a given order.

In some embodiments, therefore, activity 410 of generating first predefined frequency weights for the plurality of advertisement creatives of method 400 can comprise an activity of generating the first predefined frequency weights for the plurality of advertisement creatives based on a combination of: (1) a current click-through-rate for each advertisement creative of the plurality of advertisement creatives; (2) a previous two weeks click-through-rate for each advertisement creative of the plurality of advertisement creatives; (3) a previous two weeks conversion rate for each advertisement creative of the plurality of advertisement creatives; (4) a long-term click-through-rate trend for each advertisement creative of the plurality of advertisement creatives; (5) a short-term click-through-rate trend for each advertisement creative of the plurality of advertisement creatives; (6) a long-term conversion rate trend for each advertisement creative of the plurality of advertisement creatives; and (7) a short-term conversion rate trend for each advertisement creative of the plurality of advertisement creatives. In these or other embodiments, generating first predefined frequency weights for the plurality of advertisement creatives can be based on one or more of: (1) average conversion rates and/or click-through-rates of other advertisement creatives of the plurality of advertisement creatives; (2) correlations among other advertisement creatives of the plurality of advertisement creatives; and/or (3) a random forest regression model trained on data from all advertisement creatives of the plurality of advertisement creatives with a given order.

Cold-starting an advertisement campaign can be a significant challenge to data-driven solutions. For the first line item of a new order, there is very sparse conversion data to build a predictive model. Even the empirical conversion rate values can be unreliable. To address this problem, a stage-wise evolution on the optimization of advertisement creatives is contemplated. The stage-wise evolution on the optimization of advertisement creatives uses data from selected intervals, such as the click-through rate of the advertisement creatives available two weeks after an advertisement campaign begins, the click-through rate and the conversion rate of the plurality of advertisement creatives four weeks after the advertisement campaign begins, and the click-through rate and the conversion rate of the plurality of advertisement creatives six weeks after the advertisement campaign begins.

Thus, in some embodiments, generating the first predefined frequency weights for the plurality of advertisement creatives comprises at least one, at least two, or all three of the following: (1) generating the first predefined frequency weights for the plurality of advertisement creatives after a first time period after the advertisement campaign begins and based on a click-through-rate of each advertisement creative of the plurality of creatives; (2) generating the first predefined frequency weights for the plurality of advertisement creatives after a second time period after the advertisement campaign begins and based on an available conversation rate for each advertisement creative of the plurality of creatives; and/or (3) generating the first predefined frequency weights for the plurality of advertisement creatives after a third time period after the advertisement campaign begins and based on a predicted conversion rate for each advertisement creative of the plurality of advertisement creatives. In some embodiments, each of the first, second, and third time periods can increase equally in duration, while in other embodiments each of the first, second, and third time periods can be of different durations as selected by an administrator. In one, non-limiting embodiment, the first, second and third time periods increase equally in two-week durations from the beginning of the advertisement campaign, i.e. the first time period is two weeks from the beginning of the advertisement campaign, the second time period is approximately four weeks from the beginning of the advertisement campaign, and the third time period is approximately six weeks from the beginning of the advertisement campaign. Thus, generating the first predefined frequency weights for the plurality of advertisement creatives can comprise: (1) generating the first predefined frequency weights for the plurality of advertisement creatives based on a click-through-rate of each advertisement creative of the plurality of creatives two weeks after the advertisement campaign begins; (2) generating the first predefined frequency weights for the plurality of advertisement creatives based on an available conversation rate for each advertisement creative of the plurality of creatives four weeks after the advertisement campaign begins; and/or (3) generating the first predefined frequency weights for the plurality of advertisement creatives based on a predicted conversion rate for each advertisement creative of the plurality of advertisement creatives six weeks after the advertisement campaign begins.

In more particular embodiments, after activity 410, method 400 can comprise an activity 412 of selecting which of the first advertisement creative and the second advertisement creative should be displayed to the online users for the maximized total conversion of the advertisement based on the first predefined frequency weights for the plurality of advertisement creatives. According to some aspects, a probability that the first advertisement creative is selected for display within the impression slot is proportional to the higher frequency weight of the first advertisement creative, and a probability that the second advertisement creative is selected for display within the impression slot is proportional to the lower frequency weight of the second advertisement creative. In other embodiments, a probability that the first advertisement creative is selected for display within the impression slot is equal to the higher frequency weight of the first advertisement creative, and a probability that the second advertisement creative is selected for display within the impression slot is proportional to the lower frequency weight of the second advertisement creative. Other embodiments can comprise third, fourth, fifth, and so on advertisement creatives selected for display within the impression slot proportional or equal to a corresponding frequency weight of the respective advertisement creative.

After activity 412, method 400 can further comprise an activity 415 of coordinating a display of the plurality of advertisement creatives based on the first predefined frequency weights. More particularly, a method can comprise an activity of coordinating a display of the plurality of advertisement creatives within the impression slot of the webpages displayed to the online users based on the first predefined frequency weights, as generated, such that a first advertisement creative of the plurality of advertisement creatives is displayed more frequently than a second advertisement creative of the plurality of creatives because the first advertisement comprises a first frequency weight that is higher than a second frequency weight of the second advertisement creative. Coordinating the display of the plurality of advertised creatives based on the first predefined frequency weights can be according to any of the generated first predefined frequency weights as described in elsewhere in this document.

In some embodiments, method 400 can comprise activity 410 of generating first predefined frequency weights for the plurality of advertisement creatives, followed by activity 412 of selecting which advertisement creatives of the plurality of advertisement creatives should be display for the maximized total conversion of the advertisement. In other embodiments, method 400 can comprise activity 410 of generating first predefined frequency weights for the plurality of advertisement creatives, which activity 410 can comprise activity 420 of reducing statistical noise of a covariance matrix and a mean of a conversion rate for each advertisement creative of the plurality of advertisement creatives and activity 425 of combining both the long term conversion rate and the short-term conversion rate for each advertisement creative of the plurality of advertisement creatives, followed by activity 412 of selecting which advertisement creatives of the plurality of advertisement creatives should be display for the maximized total conversion of the advertisement.

In some embodiments, method 400 can comprise activity 410 of generating first predefined frequency weights for the plurality of advertisement creatives, which activity 410 can comprise activity 430 of automatically setting one or more tuning parameters for the first predefined frequency weights, followed by activity 412 of selecting which advertisement creatives of the plurality of advertisement creatives should be display for the maximized total conversion of the advertisement. In other embodiments, method 400 can comprise activity 410 of generating first predefined frequency weights for the plurality of advertisement creatives, which activity 410 can comprise activity 420 of reducing statistical noise of a covariance matrix and a mean of a conversion rate for each advertisement creative of the plurality of advertisement creatives, activity 425 of combining both the long term conversion rate and the short-term conversion rate for each advertisement creative of the plurality of advertisement creatives, and activity 430 of automatically setting one or more tuning parameters for the first predefined frequency weights, followed by activity 412 of selecting which advertisement creatives of the plurality of advertisement creatives should be display for the maximized total conversion of the advertisement.

In some embodiments, method 400 can comprise activity 410 of generating first predefined frequency weights for the plurality of advertisement creatives, which activity 410 can comprise activity 435 of requiring a best-case expected return for each advertisement creative to exceed a predetermined level and activity 440 of maximizing a worst-case expected return for each advertisement creative, followed by activity 412 of selecting which advertisement creatives of the plurality of advertisement creatives should be display for the maximized total conversion of the advertisement. In other embodiments, method 400 can comprise activity 410 of generating first predefined frequency weights for the plurality of advertisement creatives, which activity 410 can comprise activity 420 of reducing statistical noise of a covariance matrix and a mean of a conversion rate for each advertisement creative of the plurality of advertisement creatives, activity 425 of combining both the long term conversion rate and the short-term conversion rate for each advertisement creative of the plurality of advertisement creatives, activity 430 of automatically setting one or more tuning parameters for the first predefined frequency weights, activity 435 of requiring a best-case expected return for each advertisement creative to exceed a predetermined level, and activity 440 of maximizing a worst-case expected return for each advertisement creative, followed by activity 412 of selecting which advertisement creatives of the plurality of advertisement creatives should be display for the maximized total conversion of the advertisement.

In some embodiments, method 400 can comprise activity 410 of generating first predefined frequency weights for the plurality of advertisement creatives, which activity 410 can comprise activity 445 of setting a penalty parameter, followed by activity 412 of selecting which advertisement creatives of the plurality of advertisement creatives should be display for the maximized total conversion of the advertisement. In other embodiments, method 400 can comprise activity 410 of generating first predefined frequency weights for the plurality of advertisement creatives, which activity 410 can comprise activity 420 of reducing statistical noise of a covariance matrix and a mean of a conversion rate for each advertisement creative of the plurality of advertisement creatives, activity 425 of combining both the long term conversion rate and the short-term conversion rate for each advertisement creative of the plurality of advertisement creatives, activity 430 of automatically setting one or more tuning parameters for the first predefined frequency weights, activity 435 of requiring a best-case expected return for each advertisement creative to exceed a predetermined level, activity 440 of maximizing a worst-case expected return for each advertisement creative, and activity 445 of setting a penalty parameter, followed by activity 412 of selecting which advertisement creatives of the plurality of advertisement creatives should be display for the maximized total conversion of the advertisement.

FIG. 5 illustrates a block diagram of a portion of system 300 comprising advertisement creatives system 310, web server 320, display system 360, and optimization system 370 according to the embodiment shown in FIG. 3. Each of advertisement creatives system 310, web server 320, display system 360, and optimization system 370 is merely exemplary and not limited to the embodiments presented herein. Each of advertisement creatives system 310, web server 320, display system 360, and optimization system 370 can be employed in many different embodiments or examples not specifically depicted or described herein. In some embodiments, certain elements or modules of advertisement creatives system 310, web server 320, display system 360, and optimization system 370 can perform various procedures, processes, and/or acts. In other embodiments, the procedures, processes, and/or acts can be performed by other suitable elements or modules.

In many embodiments, advertisement creatives system 310 can comprise non-transitory memory storage module 512, display system 360 can comprise a non-transitory memory storage module 562, and optimization system 370 can comprise non-transitory memory storage module 572. Memory storage module 512 can be referred to as advertisement creatives module 512. Memory storage module 562 can be referred to as display module 562. Memory storage module 572 can be refereed to as optimization module 572.

In many embodiments, advertisement creatives module 512 can store computing instructions configured to run on one or more processing modules and perform one or more acts of method 400 (FIG. 4) (e.g., activity 405 of receiving a plurality of advertisement creatives for an advertisement campaign (FIG. 4)). In some embodiments, optimization module 572 can store computing instructions configured to run on one or more processing modules and perform one or more acts of method 400 (FIG. 4) (e.g., activity 407 of determining at least one of a conversion rate or a click-through rate for each advertisement creative of the plurality of advertisement creatives, activity 410 of generating first predefined frequency weights for the plurality of advertisement creatives, activity 420 of reducing statistical noise of a covariance matrix and a mean of a conversion rate for each advertisement creative of the plurality of advertisement creatives, activity 425 of combining both the long-term conversion ate and the short-term conversion rate for each advertisement creative of the plurality of advertisement creatives, activity 430 of automatically setting one or more tuning parameters for the first predefined frequency weights, activity 440 of maximizing a worst-case expected return for each advertisement creative, activity 435 of requiring a best-case expected return for each advertisement creative to exceed a predetermined level, activity 445 of setting a penalty parameter, and/or activity 412 of selecting which advertisement creative of the plurality of advertisement creatives should be displayed for the maximized total conversion of the advertisement (FIG. 4)). In some embodiments, display module 562 can store computing instructions configured to run on one or more processing modules and perform one or more acts of methods 400 (FIG. 4) (e.g., activity 415 of coordinating a display of the plurality of advertisement creatives based on the first predefined frequency weights (FIG. 4)).

Although optimization of advertisement creatives has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform:
receiving a plurality of advertisement creatives for an advertisement campaign, wherein:
each respective advertisement creative of the plurality of advertisement creatives is for display within a respective impression slot of respective webpages displayed to online users; and
the respective impression slot has a respective first set of dimensions for display on the respective webpages;
training a machine learning algorithm to generate first predefined frequency weights for one or more advertisement creatives of the plurality of advertisement creatives having the respective first set of dimensions for display;
generating the first predefined frequency weights for the one or more advertisement creatives of the plurality of advertisement creatives using the machine learning algorithm, as trained, wherein each of the first predefined frequency weights:
comprises a respective weighted frequency that is used to determine when to display each respective advertisement creative of the one or more advertisement creatives of the plurality of advertisement creatives to the online users;
operate as a function of a respective penalty parameter that (1) accounts for uncertainty and (2) approximates a respective standard deviation of a respective conversion rate for each advertisement creative of the one or more advertisement creatives of the plurality of advertisement creatives; and
is generated using a vector comprising the respective conversion rate for each advertisement creative of the one or more advertisement creatives of the plurality of advertisement creatives; and
coordinating displaying at least a portion of the one or more advertisement creatives of the plurality of advertisement creatives within their respective impression slots of the respective webpages displayed to the online users on electronic devices of the online users based on at least a portion of the first predefined frequency weights, as generated by the machine learning algorithm, as trained, such that a first advertisement creative of the plurality of advertisement creatives is displayed more frequently than a second advertisement creative of the plurality of advertisement creatives because the first advertisement creative comprises a first frequency weight of the first predefined frequency weights that is higher than a second frequency weight of the second advertisement creative of the first predefined frequency weights, wherein:
generating the first predefined frequency weights comprises using a first formula comprising:

$$\max_w \mu^T w$$

subject to: $w^T D w \leq p$ $$e^T w = 1$$

$$w \geq 0;$$

w is a respective vector of a frequency weight for each respective advertisement creative of the one or more advertisement creatives;
μ is a respective mean of conversion rates for each respective advertisement creative of the one or more advertisement creatives;
T is a transpose;
D is a respective diagonal covariance matrix for conversion rates for each respective advertisement creative of the one or more advertisement creatives;
p is a given constraint on a portfolio variance; and
e is a standard representation of a vector of all ones.

2. The system of claim 1, wherein the one or more non-transitory storage devices storing the computing instructions are further configured to run on the one or more processors and perform:
selecting one of the first advertisement creative or the second advertisement creative to be displayed to the online users based on the first predefined frequency weights for the one or more advertisement creatives of the plurality of advertisement creatives, wherein:
a first probability that the first advertisement creative is selected for display within the respective impression slot is proportional to the first frequency weight of the first advertisement creative; and
a second probability that the second advertisement creative is selected for display within the respective impression slot is proportional to the second frequency weight of the second advertisement creative.

3. The system of claim 1, wherein generating the first predefined frequency weights for the one or more advertisement creatives of the plurality of advertisement creatives comprises at least one of:
generating the first predefined frequency weights for the one or more advertisement creatives of the plurality of advertisement creatives:
(1) after a first time period after the advertisement campaign begins; and
(2) based on a click-through-rate of each respective advertisement creative of the plurality of advertisement creatives;
generating the first predefined frequency weights for the one or more advertisement creatives of the plurality of advertisement creatives:
(1) after a second time period after the advertisement campaign begins; and
(2) based on a respective available conversion rate for each respective advertisement creative of the plurality of advertisement creatives, wherein the respective conversion rate comprises the respective available conversion rate; or generating the first predefined frequency weights for the one or more advertisement creatives of the plurality of advertisement creatives:
(1) after a third time period after the advertisement campaign begins; and
(2) based on a respective predicted conversion rate for each respective advertisement creative of the one or more advertisement creatives of the plurality of advertisement creatives, wherein the respective conversion rate comprises the respective predicted conversion rate.

4. The system of claim 1, wherein generating the first predefined frequency weights for the one or more advertisement creatives of the plurality of advertisement creatives comprises:

generating the first predefined frequency weights for the one or more advertisement creatives of the plurality of advertisement creatives based on a combination of:
(1) a respective current click-through-rate for each respective advertisement creative of the one or more advertisement creatives of the plurality of advertisement creatives;
(2) a respective previous two weeks click-through-rate for each respective advertisement creative of the one or more advertisement creatives of the plurality of advertisement creatives;
(3) a respective previous two weeks conversion rate for each respective advertisement creative of the one or more advertisement creatives of the plurality of advertisement creatives, wherein the respective conversion rate comprises the respective previous two weeks conversion rate;
(4) a respective long-term click-through-rate trend for each respective advertisement creative of the one or more advertisement creatives of the plurality of advertisement creatives;
(5) a respective short-term click-through-rate trend for each respective advertisement creative of the one or more advertisement creatives of the plurality of advertisement creatives;
(6) a respective long-term conversion rate trend for each respective advertisement creative of the one or more advertisement creatives of the plurality of advertisement creatives; and
(7) a respective short-term conversion rate trend for each respective advertisement creative of the one or more advertisement creatives of the plurality of advertisement creatives.

5. The system of claim 1, wherein:

the one or more non-transitory storage devices storing the computing instructions are further configured to run on the one or more processors and perform:
determining the respective conversion rate for each respective advertisement creative of the one or more advertisement creatives of the plurality of advertisement creatives, the respective conversion rate for each respective advertisement creative of the one or more advertisement creatives of the plurality of advertisement creatives comprising at least one of:
(1) a respective long-term conversion rate for each respective advertisement creative of the one or more advertisement creatives of the plurality of advertisement creatives, as measured, since the advertisement campaign began; or
(2) a respective short-term conversion rate for each respective advertisement creative of the one or more advertisement creatives of the plurality of respective advertisement creatives, as measured over a predetermined period of time; and generating the first predefined frequency weights for the one or more advertisement creatives of the plurality of advertisement creatives comprises:
reducing statistical noise of a covariance matrix and a respective mean of the respective conversion rate for each respective advertisement creative of the one or more advertisement creatives of the plurality of advertisement creatives.

6. The system of claim 5, wherein generating the first predefined frequency weights for the one or more advertisement creatives of the plurality of advertisement creatives further comprises:

combining both of the respective long-term conversion rate and the respective short-term conversion rate for each respective advertisement creative of the one or more advertisement creatives of the plurality of advertisement creatives.

7. The system of claim 1, wherein generating the first predefined frequency weights for the plurality of advertisement creatives comprises automatically setting one or more tuning parameters for the first predefined frequency weights.

8. The system of claim 1, wherein generating the first predefined frequency weights for the one or more advertisement creatives of the plurality of advertisement creatives comprises:

requiring a respective best-case expected return for each respective advertisement creative of the one or more advertisement creatives of the plurality of advertisement creatives to exceed a respective predetermined level;

maximizing a respective worst-case expected return for each respective advertisement creative of the one or more advertisement creatives of the plurality of advertisement creatives; and setting the respective penalty parameter.

9. The system of claim 8, wherein:

maximizing the respective worst-case expected return for each respective advertisement creative of the one or more advertisement creatives of the plurality of advertisement creatives comprises using a second formula:

$$\min_{w,\delta} -\underline{\mu}^T w + \rho\delta$$

$$\text{subject to: } \left\| \overline{D}^{\frac{1}{2}} w \right\| \leq \delta$$

$$(\mu + \sigma)^T w \geq q$$

$$e^T w = 1$$

$$w \geq 0;$$

and requiring the respective best-case expected return for each respective advertisement creative of the one or more advertisement creatives of the plurality of advertisement creatives to exceed the respective predetermined level comprises using the first formula, wherein:

$\underline{\mu}$ is a lower bound of $\mu$;

$\rho$ is the respective penalty parameter;

$\delta$ is a decision variable;

σ is the respective standard deviation of the respective conversion rate for each respective advertisement creative of the one or more advertisement creatives of the plurality of advertisement creatives;

$\overline{D}$ is an upper bound of D; and q is a benchmark conversion rate level.

10. The system of claim 1, wherein the machine learning algorithm is trained on:
(1) a respective current click-through-rate for each respective advertisement creative of the one or more advertisement creatives of the plurality of advertisement creatives and a respective previous click-through-rate for a previous week for each respective advertisement creative of the one or more advertisement creatives of the plurality of advertisement creatives;
(2) a respective long-term click-through-rate trend for each respective advertisement creative of the one or more advertisement creatives of the plurality of advertisement creatives; or
(3) a combination of (1) and (2).

11. A method, comprising:
receiving a plurality of advertisement creatives for an advertisement campaign, wherein:
each respective advertisement creative of the plurality of advertisement creatives is for display within a respective impression slot of respective webpages displayed to online users; and
the respective impression slot has a respective first set of dimensions for display on the respective webpages;
training a machine learning algorithm to generate first predefined frequency weights for one or more advertisement creatives of the plurality of advertisement creatives having the respective first set of dimensions for display;
generating the first predefined frequency weights for the one or more advertisement creatives of the plurality of advertisement creatives using the machine learning algorithm, as trained, wherein each of the first predefined frequency weights:
comprises a respective weighted frequency that is used to determine when to display each respective advertisement creative of the one or more advertisement creatives of the plurality of advertisement creatives to the online users;
operate as a function of a respective penalty parameter that (1) accounts for uncertainty and (2) approximates a respective standard deviation of a respective conversion rate for each advertisement creative of the one or more advertisement creatives of the plurality of advertisement creatives; and
is generated using a vector comprising the respective conversion rate for each advertisement creative of the one or more advertisement creatives of the plurality of advertisement creatives; and
coordinating displaying at least a portion of the one or more advertisement creatives of the plurality of advertisement creatives within their respective impression slots of the respective webpages displayed to the online users on electronic devices of the online users based on at least a portion of the first predefined frequency weights, as generated by the machine learning algorithm, as trained, such that a first advertisement creative of the plurality of advertisement creatives is displayed more frequently than a second advertisement creative of the plurality of advertisement creatives because the first advertisement creative comprises a first frequency weight of the first predefined frequency weights that is higher than a second frequency weight of the second advertisement creative of the first predefined frequency weights, wherein:
generating the first predefined frequency weights comprises using a first formula comprising:

$\max_w \mu^T w$ subject to: $w^T D w \leq p$ $e^T w = 1$ $w \geq 0$;

w is a respective vector of a frequency weight for each respective advertisement creative of the one or more advertisement creatives;

μ is a respective mean of conversion rates for each respective advertisement creative of the one or more advertisement creatives;

T is a transpose;

D is a respective diagonal covariance matrix for conversion rates for each respective advertisement creative of the one or more advertisement creatives;

p is a given constraint on a portfolio variance; and e is a standard representation of a vector of all ones.

12. The method of claim 11, further comprising:
selecting one of the first advertisement creative or the second advertisement creative to be displayed to the online users based on the first predefined frequency weights for the one or more advertisement creatives of the plurality of advertisement creatives, wherein:
a first probability that the first advertisement creative is selected for display within the respective impression slot is proportional to the first frequency weight of the first advertisement creative; and
a second probability that the second advertisement creative is selected for display within the respective impression slot is proportional to the second frequency weight of the second advertisement creative.

13. The method of claim 11, wherein generating the first predefined frequency weights for the one or more advertisement creatives of the plurality of advertisement creatives comprises at least one of:
generating the first predefined frequency weights for the one or more advertisement creatives of the plurality of advertisement creatives:
(1) after a first time period after the advertisement campaign begins; and
(2) based on a click-through-rate of each respective advertisement creative of the plurality of advertisement creatives;
generating the first predefined frequency weights for the one or more advertisement creatives of the plurality of advertisement creatives:
(1) after a second time period after the advertisement campaign begins; and
(2) based on a respective available conversion rate for each respective advertisement creative of the plurality of advertisement creatives, wherein the respective conversion rate comprises the respective available conversion rate; or
generating the first predefined frequency weights for the one or more advertisement creatives of the plurality of advertisement creatives:
(1) after a third time period after the advertisement campaign begins; and (2) based on a respective predicted conversion rate for each respective advertisement creative of the one or more advertisement creatives of the plurality of advertisement creatives, wherein the respective conversion rate comprises the respective predicted conversion rate.

14. The method of claim 11, wherein generating the first predefined frequency weights for the one or more advertisement creatives of the plurality of advertisement creatives comprises:
generating the first predefined frequency weights for the one or more advertisement creatives of the plurality of advertisement creatives based on a combination of:
(1) a respective current click-through-rate for each respective advertisement creative of the one or more advertisement creatives of the plurality of advertisement creatives;
(2) a respective previous two weeks click-through-rate for each respective advertisement creative of the one or more advertisement creatives of the plurality of advertisement creatives;
(3) a respective previous two weeks conversion rate for each respective advertisement creative of the one or more advertisement creatives of the plurality of advertisement creatives, wherein the respective conversion rate comprises the respective previous two weeks conversion rate;
(4) a respective long-term click-through-rate trend for each respective advertisement creative of the one or more advertisement creatives of the plurality of advertisement creatives;
(5) a respective short-term click-through-rate trend for each respective advertisement creative of the one or more advertisement creatives of the plurality of advertisement creatives;
(6) a respective long-term conversion rate trend for each respective advertisement creative of the one or more advertisement creatives of the plurality of advertisement creatives; and
(7) a respective short-term conversion rate trend for each respective advertisement creative of the one or more advertisement creatives of the plurality of advertisement creatives.

15. The method of claim 11, wherein:
the method further comprises:
determining the respective conversion rate for each respective advertisement creative of the one or more advertisement creatives of the plurality of advertisement creatives, the respective conversion rate for each respective advertisement creative of the one or more advertisement creatives of the plurality of advertisement creatives comprising at least one of:
(1) a respective long-term conversion rate for each respective advertisement creative of the one or more advertisement creatives of the plurality of advertisement creatives, as measured, since the advertisement campaign began; or
(2) a respective short-term conversion rate for each respective advertisement creative of the one or more advertisement creatives of the plurality of respective advertisement creatives, as measured over a predetermined period of time; and
generating the first predefined frequency weights for the one or more advertisement creatives of the plurality of advertisement creatives comprises:
reducing statistical noise of a covariance matrix and a respective mean of the respective conversion rate for each respective advertisement creative of the one or more advertisement creatives of the plurality of advertisement creatives.

16. The method of claim 15, wherein generating the first predefined frequency weights for the one or more advertisement creatives of the plurality of advertisement creatives further comprises:
combining both of the respective long-term conversion rate and the respective short-term conversion rate for each respective advertisement creative of the one or more advertisement creatives of the plurality of advertisement creatives.

17. The method of claim 11, wherein generating the first predefined frequency weights for the plurality of advertisement creatives comprises automatically setting one or more tuning parameters for the first predefined frequency weights.

18. The method of claim 11, wherein generating the first predefined frequency weights for the one or more advertisement creatives of the plurality of advertisement creatives comprises:
requiring a respective best-case expected return for each respective advertisement creative of the one or more advertisement creatives of the plurality of advertisement creatives to exceed a respective predetermined level;
maximizing a respective worst-case expected return for each respective advertisement creative of the one or more advertisement creatives of the plurality of advertisement creatives; and
setting the respective penalty parameter.

19. The method of claim 18, wherein:
maximizing the respective worst-case expected return for each respective advertisement creative of the one or more advertisement creatives of the plurality of advertisement creatives comprises using a second formula:

$$\min_{w,\delta} -\underline{\mu}^T w + \rho\delta$$
$$\text{subject to: } \|\overline{D}^{\frac{1}{2}} w\| \le \delta$$
$$(\mu + \sigma)^T w \ge q$$
$$e^T w = 1$$
$$w \ge 0;$$

and
requiring the respective best-case expected return for each respective advertisement creative of the one or more advertisement creatives of the plurality of advertisement creatives to exceed the respective predetermined level comprises using the first formula,
wherein:
$\underline{\mu}$ is a lower bound of $\mu$;
p is the respective penalty parameter;
$\delta$ is a decision variable;
$\sigma$ is the respective standard deviation of the respective conversion rate for each respective advertisement creative of the one or more advertisement creatives of the plurality of advertisement creatives;
$\overline{D}$ is an upper bound of D;
q is a benchmark conversion rate level.

20. The method of claim 11, wherein the machine learning algorithm is trained on:
(1) a respective current click-through-rate for each respective advertisement creative of the one or more advertisement creatives of the plurality of advertisement creatives and a respective previous click-through-rate for a previous week for each respective advertisement creative of the one or more advertisement creatives of the plurality of advertisement creatives;

(2) a respective long-term click-through-rate trend for each respective advertisement creative of the one or more advertisement creatives of the plurality of advertisement creatives; or (3) a combination of (1) and (2).

* * * * *